United States Patent
Okamori et al.

[11] Patent Number: 5,808,759
[45] Date of Patent: Sep. 15, 1998

[54] PROJECTION TYPE DISPLAY INCLUDING A HOLOGRAPHIC DIFFUSER

[75] Inventors: Shinji Okamori; Akira Daijogo; Hiroshi Kida; Shinsuke Shikama; Hirokazu Taguchi, all of Tokyo, Japan

[73] Assignee: Mitsubishi Denki Kabushiki Kaisha, Tokyo, Japan

[21] Appl. No.: 758,016

[22] Filed: Nov. 27, 1996

[30] Foreign Application Priority Data

Nov. 30, 1995 [JP] Japan ................................. 7-312800

[51] Int. Cl.⁶ ............................. G02B 5/32; G02B 5/02; G02F 1/1335; F21V 13/04
[52] U.S. Cl. .......................... 359/15; 359/837; 359/599; 359/709; 349/67; 362/308; 362/328
[58] Field of Search ............................. 359/15, 16, 837, 359/599, 709; 349/64, 67; 362/308, 328; 355/67

[56] References Cited

U.S. PATENT DOCUMENTS 5,471,327  11/1995  Tedesco et al. ............................. 359/15
5,659,409   8/1997  Ooi et al. ................................... 349/67

FOREIGN PATENT DOCUMENTS 6-138386  5/1994  Japan .
6-265887  9/1994  Japan .

Primary Examiner—Jon W. Henry

[57] ABSTRACT

A light source device including a light emitting element emits a luminous flux, which is converged by a reflecting mirror. A conical light-refracting element receives the luminous flux converged by the reflecting mirror and changes the cone angle of the luminous flux. The luminous flux exiting the conical light-refracting element is diffused by a holographic diffuser and is then converged by at least one lens. The reflecting mirror may have an elliptic curvature or a parabolic curvature. The light source device is also used to form a projector for a projection type display apparatus. In the projector, the luminous flux emitted from the light source device may be separated by color separators into a plurality of colors of light. Then, each color of light is directed to the corresponding one of a plurality of light valves. Then, a color synthesizer synthesizes the colors of light emitted from the light valves into a composite image which in turn is projected onto a screen. A plurality of such projectors are used to construct a multiscreen projection type display system where each of the projectors projects a corresponding image. At least one reflecting mirror for bending a corresponding one of the images is included in the multiscreen projection type display system. The reflecting mirror projects the image onto a screen so that the images emitted from the plurality of projectors are combined into a composite image on the screen.

17 Claims, 9 Drawing Sheets

FIG.13

TABLE 1

| TYPE OF DIFFUSER | TOTAL LUMINOUS FLUX (lm) | CENTRAL ILLUMINANCE (lX) | CORNER-TO-CENTER ILLUMINANCE RATIO (%) | UNIFORMITY OF COLOR |
|---|---|---|---|---|
| NOT INSERTED | 231.1 | 2330 | 14.0 | POOR |
| SURFACE DIFFUSER | 114.7 | 686 | 35.7 | EXCELLENT |
| CIRCULAR DIFFUSER 5° | 130.3 | 780 | 34.1 | FAIR |
| CIRCULAR DIFFUSER 10° | 92.3 | 467 | 46.8 | GOOD |
| ELLIPTICAL DIFFUSION 20°×10° | 72.7 | 346 | 52.7 | EXCELLENT |

PROJECTION TYPE DISPLAY INCLUDING A HOLOGRAPHIC DIFFUSER

BACKGROUND OF THE INVENTION

1. Technical Field of the Invention

The present invention relates to a light source apparatus using a holographic element and an apparatus to which such a light source apparatus is applied. Such apparatuses include a lighting apparatus and display apparatus. The present invention particularly relates to a projection type display apparatus where light valves are used to project an image to a screen.

2. Description of Related Art

FIG. 15 illustrates a general construction of a prior art projection type display apparatus disclosed in Japanese Patent Preliminary Publication No. 6-265887 which was laid open on Sep. 22, 1994.

As shown in FIG. 15, the luminous flux emitted from each of the light sources 101a and 101b are reflected by the curved surfaces of reflecting mirrors 102a and 102b, respectively and then directed toward the middle of a liquid crystal panel 109. Optical element 118 renders the luminous flux more uniform and includes a first lens plate 103 and a second lens plate 104. Each of the lenses in the second lens plate 104 causes the image of the corresponding lens in the first lens plate 103 to be formed on a display area 306 of the liquid crystal panel 109. In other words, images of the respective lenses in the first lens plate 103 are superimposed on the display area 306. The chief ray 302 of the luminous flux from each lens in the first lens plate 103 that is incident upon the peripheral portion of the display area 306 of the liquid crystal panel 109 is in alignment with lines connecting the center of each lens of the second lens plate 104 and the peripheral portion of the display area 306. In other words, the luminous flux to the liquid crystal display panel 109 is a divergent bundle of rays from the respective lenses of the second lens plate 104. This diverging bundle of rays requires a field lens 108 which converts the divergent bundle of rays into a parallel luminous flux. Thus, the chief rays 302 are incident upon the entire surface area of the liquid crystal panel 109. The luminous flux passing through the liquid crystal panel 109 is incident upon the projection lens assembly 116 which enlarges and projects the luminous flux. In this manner, the projection type display apparatus projects a high-quality, bright image having a uniform illuminance distribution which is also free from non-uniform color.

The aforementioned prior art projection type display apparatus illustrated in FIG. 15 uses a technique referred to as an integrator illumination where light emitted from a light emitting element is subdivided into a plurality of light beams having cross sections arranged in a grid-like pattern which are superimposed on the illuminated surface. Integrator illumination is a technique for providing uniform illumination which is commonly used in exposure devices and microscopes. Integrator illumination is highly effective in improving uniformity in lighting characteristics, particularly variations of uniformity in illumination inherent in the light source and provides a method of converging the light emitted from the light source. The integrator illumination is also capable of reducing poor uniformity of color which prominently appears when a plurality of light sources are used as in the aforementioned prior art display apparatus, and therefore improves the uniformity of illumination and color.

Integrator illumination is very effective in obtaining uniform illumination when used in a single light source system and in a liquid crystal projector of a single plate projection type. However, the cone angle of a luminous flux dynamically changes in integrator illumination. Therefore, if integrator illumination is used in a projection type display apparatus where a plurality of light valves are used, the deterioration of color uniformity is inevitable due to variations in incident angle of the luminous flux incident upon the color separating/synthesizing optical system.

Moreover, integrator illumination uses a two-lens array by which the luminous fluxes are superimposed. This necessitates a larger overall space and adds to the total cost of the optical system. If changes in cone angle of the luminous flux are to be minimized for improved uniformity of color on the illuminated surface, the two lenses must be positioned sufficiently far away from each other which is an obstacle to miniaturizing the apparatus.

SUMMARY OF THE INVENTION

An object of the invention is to provide a lighter weight and smaller sized light source apparatus which is inexpensive and provides uniform illumination and uniform color on the illuminated surface.

Another object of the invention is to provide a mirror for use in the aforementioned light source apparatus, the mirror being highly efficient in converging light.

A still another object of the invention is to provide a light source where light converged by the reflecting mirror into an area has light rays having substantially uniformly distributed incident angles with respect to the cross-sectional area of the reflected light.

Yet another object of the invention is to provide a projection type display apparatus where the aforementioned light source is used to improve the uniformity of illumination and the uniformity of color.

A further object of the invention is to provide a multi-projection type display apparatus for providing a composite image where uniformity in illumination and color among a plurality of projected images are improved by using the aforementioned light source.

The objects of the present invention are achieved by providing a light source apparatus including a light emitting element that emits a luminous flux, a reflecting mirror for converging the emitted luminous flux, a conical light-refracting element for changing the cone angle of the luminous flux converged by the reflecting mirror, at least one lens for converging the luminous flux exiting the conical light-refracting element, and a holographic diffuser for diffusing and shaping the luminous flux.

The objects of the invention are further achieved by providing the light source apparatus with an elliptic reflecting mirror having an ellipsoidal surface of revolution centered on an optical axis thereof, or a parabolic reflecting mirror having a parabolic curvature described by the rotation of a curve derived from equations $$Y=2\{f(f+X)\}^{1/2} \quad \text{where } -f \leq X \leq 0$$

$$Y=2\{f(f-X)\}^{1/2} \quad \text{where } 0 \leq X \leq f$$

about the Y-axis of an orthogonal coordinate (X, Y) where f is a focal length of the parabolic curvature.

The objects of the present invention are still further achieved by providing a plurality of the aforementioned light source apparatuses in a multiscreen projection type display apparatus having a plurality of projectors projecting a corresponding light of image, at least one reflecting mirror bending the corresponding one of the images and projecting the image onto a screen so that the images emitted from the plurality of projectors are combined into a composite image on the screen.

The objects of the invention are even further achieved by providing a projection type display apparatus utilizing the luminous flux emitted from the light source apparatus which is then separated by a color separator into a plurality of colors of light, directing each color to the corresponding one of a plurality of light valves, synthesizing the colors of emitted from the respective light valves with a color synthesizer and projecting the synthesized light with a projection lens to form a single combined image on a screen.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13 shows Table 1 which lists values for a total of five different cases in the third embodiment;

DETAILED DESCRIPTION OF THE INVENTION

The present invention will be described in detail with reference to the drawings.

First Embodiment

Figure 1:
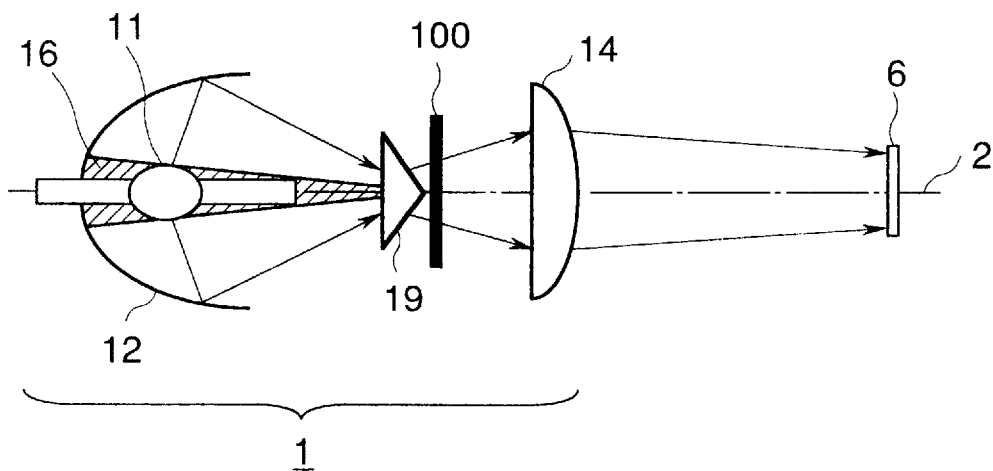
FIG. 1 illustrates a general construction of a light source apparatus according to a first embodiment.

FIG. 1 illustrates a general construction of a light source apparatus according to a first embodiment. Referring to FIG. 1, the light source apparatus 1 includes the light source 11, concave reflecting mirror 12, conical light-refracting element 19, lens 14, and holographic diffuser 100.

The light source 11 is a pressure voltage discharge lamp such as a metal halide lamp, xenon lamp, or halogen lamp which emits white light. The reflecting mirror 12 takes the form of a well-known elliptical mirror having an ellipsoidal surface of revolution centered on the optical axis 2. The reflecting mirror 12 may also take the form of a later described orthogonal parabolic reflector having a paraboloid of revolution centered on the optical axis 2. The conical light-refracting element 19 is a light-refracting element in the shape of, for example, a cone and is located in the vicinity of the converging point of the reflecting mirror 12. The lens 14 converges the divergent luminous flux from the conical light-refracting element 19 into a convergent luminous flux.

The holographic diffuser 100 may be placed anywhere from immediately in front of the conical light-refracting element 19 to a target 6. Highest efficiency is obtained when the holographic diffuser 100 is placed at a position where the luminous flux has a smallest diameter. Thus, in FIG. 1, the holographic diffuser 100 is in a light path between the conical light-refracting element 19 and the lens 14.

The target 6 is located downstream of the light source apparatus 1 and may be, for example, a light valve such as a liquid crystal panel.

With the aforementioned light source apparatus 1, the luminous flux emitted from the light source 11 is converged by the concave reflecting mirror 12 and is incident upon the conical light-refracting element 19 disposed in the vicinity of the converging point of the reflecting mirror 12. The divergent bundle of rays exiting from the conical light-refracting element 19 is diverged by the holographic diffuser 100 and the lens 14 facilitates efficient illumination of the target 6 disposed downstream of the holographic diffuser 100 by converging the bundle of rays.

The holographic diffuser 100 diffuses light as in a diffuser plate. The holographic diffuser 100 also maintains a cone angle of light within a desired range. A holographic diffuser may be made using the holography technique similar to the surface relief technique, forming fine uneven surfaces in the surface of a substrate material. This construction offers effects similar to those obtained by numerous microlenses randomly arranged on a flat plane. This lens effect allows controlling of the cone angle of an incident light beam. In addition to this lens effect, the holographic diffuser 100 also creates a hologram effect which produces a luminous flux having a desired cross section such as circle, ellipse, or rectangle when placed at a desired location in the path of the light beam. One such type of holographic diffuser is an LSD (Light Shaping Diffuser) which may be used in the invention is manufactured by Physical Optics Corporation. The properties of LSDs are discussed in technical documents presented by Physical Optics Corporation, i.e., "HOLOGRAPHIC LIGHT SHAPING DIFFUSERS" (By Jeremy M. Lerner, Rick Shie, Joel Petersen, presented at the Aerospace Lighting Institute, Advanced Seminar, February 1994) or "Surface relief holography for use in display screens" (By R. L. Shie, C. W Chau, J. M. Lerner). Reference is made to these technical documents for details regarding holographic diffusers.

Figure 2:
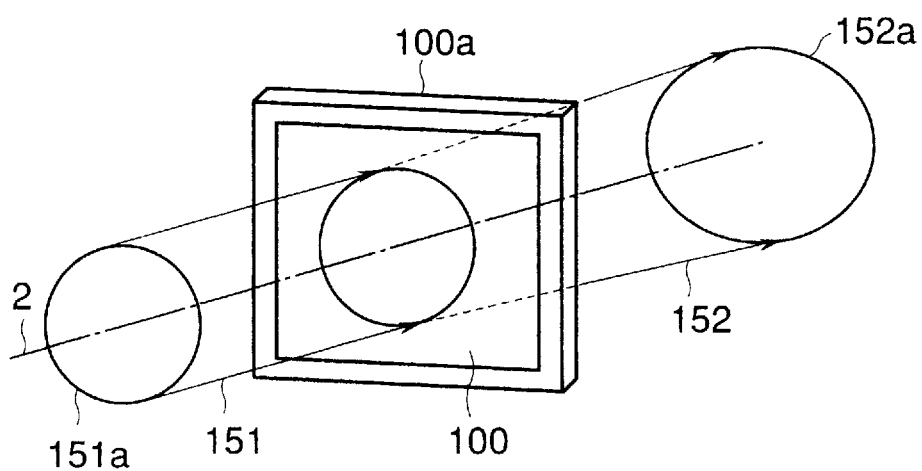
FIG. 2 illustrates the operation of a holographic diffuser.

FIG. 2 illustrates the operation of the holographic diffuser 100. Referring to FIG. 2, a luminous flux 151 has a substantially circular cross section 151a perpendicular to its optical axis 2. A piece of flat glass 100a holds the holographic diffuser 100 on its surface. The holographic diffuser 100 has a thickness less than 1 mm and has, therefore, a high degree of freedom in terms of arrangement in an optical system. The holographic diffuser 100 may be formed in the surface of a material such as resin, which has high machinability, and therefore may be made in a variety of shapes.

In an example of the present embodiment, the holographic diffuser 100 is formed in the surface of the flat glass 100a having a thickness of 1.1 mm and is therefore easily arranged in an illumination system.

As shown in FIG. 2, an elliptical holographic diffuser 100 converts the circular luminous flux 151 incident thereon into an elliptical luminous flux 152. If the target 6 is rectangular, this elliptical luminous flux 152 serves to reduce a portion of the luminous flux falling in an area outside of the rectangular target 6. This reduction in wasted luminous flux is particularly important if the target 6 in FIG. 1 is a light valve in the form of, for example, a rectangular liquid crystal panel. Thus, a luminous flux having an elliptic cross section 152a offers highly efficient illumination especially with respect to rectangular light valves.

As mentioned above, inserting the holographic diffuser 100 into an existing optical system efficiently improves the quality of luminous flux for illumination. Of course, an optical system for illumination may also be designed using a holographic diffuser. For example, if the target 6 is of a rectangular shape, then a holographic diffuser may advantageously be used which provides a diffused luminous flux for illumination having a rectangular cross section. Being capable of providing a rectangular cross section of a desired aspect ratio, the holographic diffuser 100 lends itself to implementation of highly efficient illumination of the target 6 in the form of, for example, light valves used for displaying characters and image information which often have a rectangular aspect ratio such as 4:3 and 16:9.

The diffusion angle of the holographic diffuser 100 may be defined in terms of largest angle at which the intensity of a luminous flux decreases to 5% of a maximum value obtained in the illuminated plane. The relationship between diffusion effect and the location at which the holographic diffuser 100 is inserted was investigated using three kinds of holographic diffusers, i.e., two circular holographic diffusers having diffusion angles of five degrees and ten degrees, respectively, and an elliptical holographic diffuser having a diffusion angle of 20 degrees in the major axis-direction and a diffusion angle of 10 degrees in the minor axis-direction. The diffusion angles of the holographic diffusers used in the investigation are according to the aforementioned definition. A surface diffuser in the form of a flat glass having a roughened surface was also evaluated for comparison.

Figure 3:
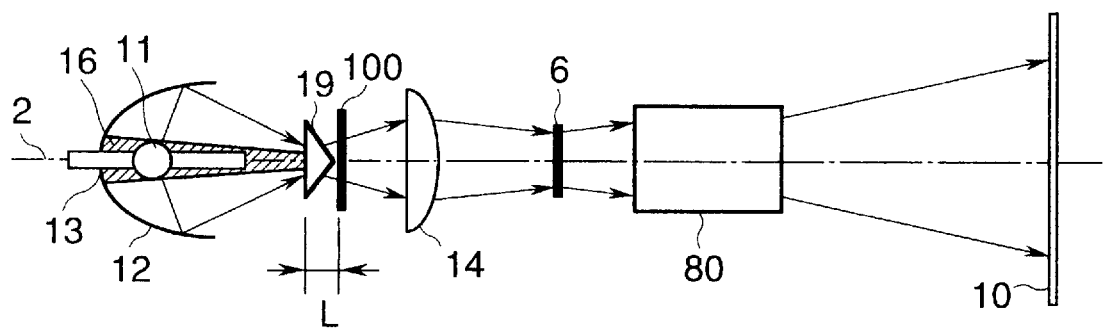
FIG. 3 illustrates a general construction of a projection type display system which was used to investigate the relationship between diffusion effect and location at which the holographic diffuser is inserted.

FIG. 3 illustrates a general construction of a projection type display system which was used to investigate the relationship between diffusion effect and the location at which the holographic diffuser 100 is inserted. Referring to FIG. 3, the projection type display system includes a metal halide lamp 11; an elliptical mirror 12 having an ellipsoidal surface of revolution centered on the optical axis 2, a conical prism 19; a holographic diffuser 100; a collimator lens 14; a thin, flat glass plate serving as the target 6 and having a 1.3-inch rectangular aperture with an aspect ratio of 3:4; projection lens 80, and a 30-inch reflection-type screen 10. L indicates the distance between the holographic diffuser 100 and the surface of the conical prism 19 upon which the light is incident. The conical prism 19 has a thickness of 18 mm, a vertex angle of 100 degrees, and a refracting index of 1.52. The collimator lens 14 has a focal length of 70 mm and a diameter of 60 mm. The operation of the optical system from the light source 11 to the flat glass plate 6 is the same as that shown in FIG. 1. The luminous flux passing through the rectangular aperture in the flat glass plate 6 is magnified by the projection lens 80 and projected onto the 30-inch screen 10.

To gather comparison data, the aforementioned three kinds of holographic diffusers 100 are inserted at several positions between the conical prism 19 and the collimator 14. Variations in distribution of illuminance of the image of the rectangular aperture were evaluated for a plurality of positions of the holographic diffuser relative to the conical prism 19. Measurements were made at the center and corners of the rectangular aperture where the image height is 80% in order to determine total luminous flux in lumens (lm), average peripheral illuminance in luxes (lx), and corner-to-center illuminance ratio in percentage (%).

Figure 4:
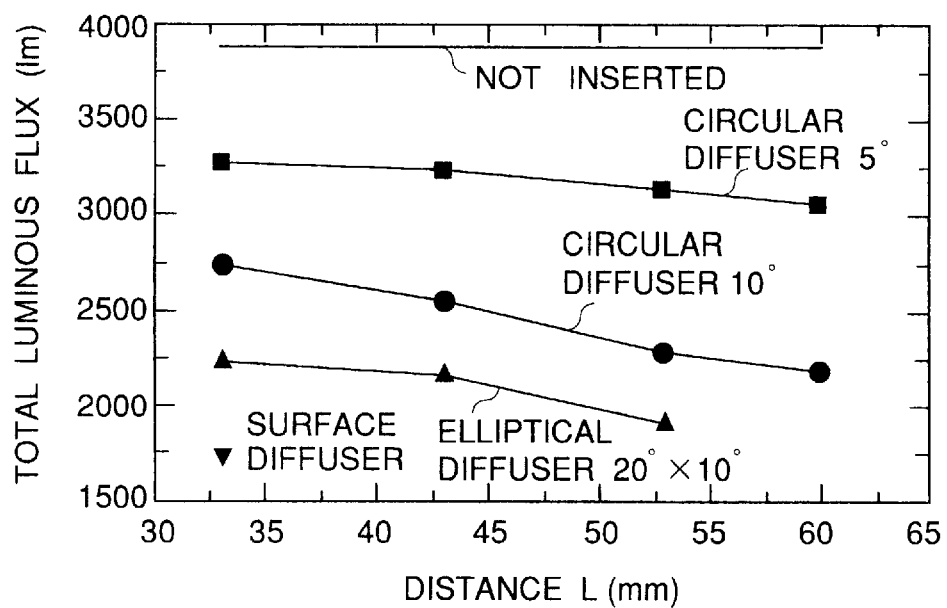
FIGS. 4–6 illustrate the relationships between the diffusion angle of holographic diffuser, the location of the holographic diffuser and the quality of luminous flux.
Figure 5:
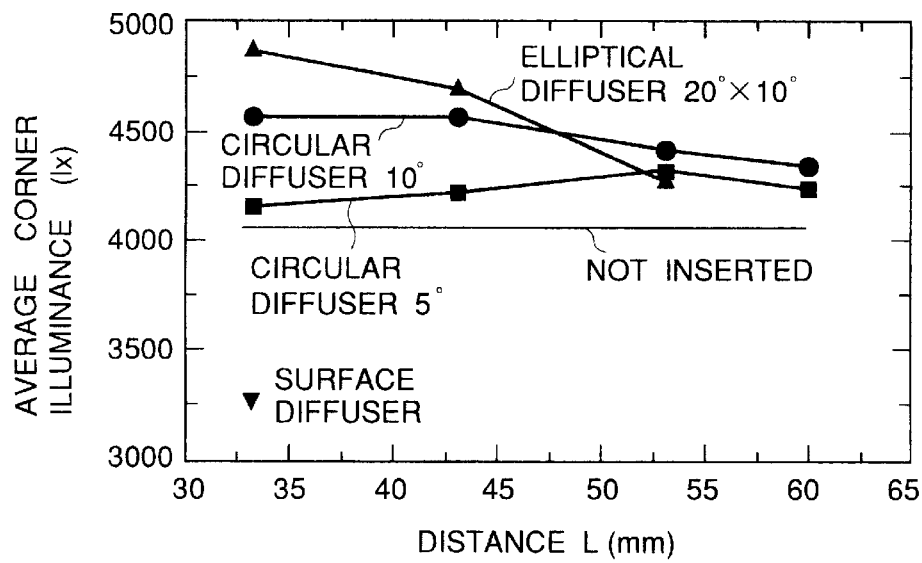
Figure 6:
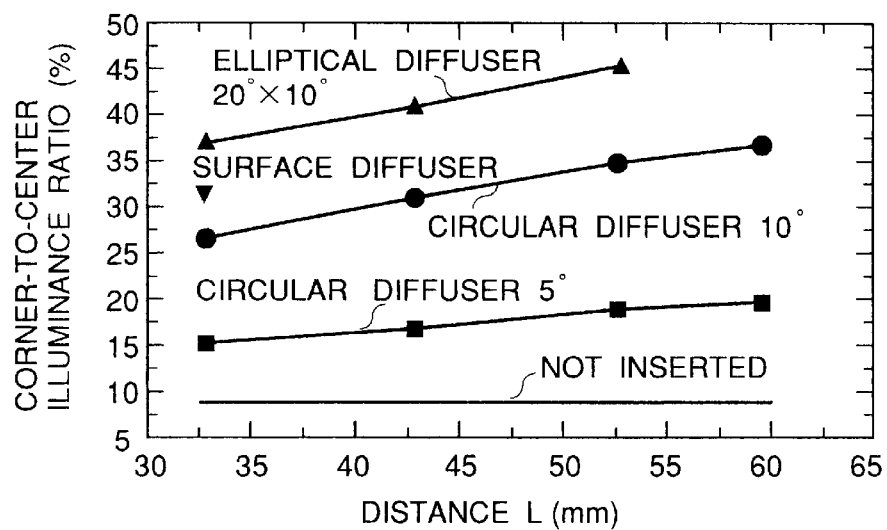

FIG. 4 illustrates the variation of total luminous flux with position of the holographic diffuser 100. FIG. 5 shows the variation of average corner illuminance with position of the holographic diffuser. FIG. 6 shows the variation of corner-to-center illuminance ratio with the position of the holographic diffuser.

FIGS. 4–6 also show values when no diffusing element is inserted in the light path and values when the surface diffuser polished using ground glass #1500 is inserted. FIG. 4 shows that total luminous flux decreases with increasing diffusion angle, and shows the effect of inserting a diffuser as opposed to not inserting a diffuser. FIG. 4 also illustrates that the screen 10 is illuminated with higher efficiency when holographic diffusers 100 are inserted in the light path than when the surface diffuser is inserted.

FIG. 5 shows that luminous flux is more uniformly distributed over the entire area of the target 6 rather than being concentrated only in the vicinity of the center of the target when holographic diffusers are inserted. FIG. 5 also shows that the average corner illuminance actually decreases when a surface diffuser is inserted as opposed to not inserting any type of diffuser. FIG. 6 shows that using the holographic diffusers achieves prominently high corner-to-center illuminance ratio as opposed to not using a diffusion element. In summary, the above results show that holographic diffusers are highly effective in improving uniformity in illumination.

Figure 7:
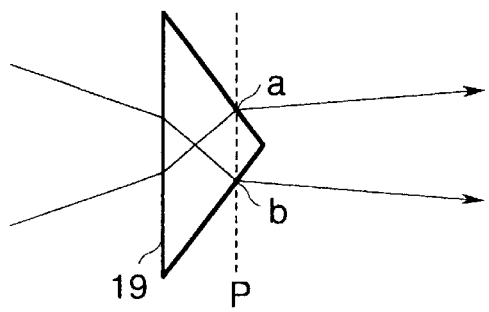
FIG. 7 illustrates a secondary light source formed in a conical light-refracting element in the first embodiment.

In the first embodiment shown in FIG. 1, the contour defined by the cross section of a luminous flux passing through the conical light-refracting element 19 serves as a circular, plane light source, i.e., a secondary light source when seen from the optical system positioned downstream of the conical light-refracting element 19. The conical light-refracting element 19 is positioned such that the area bounded by this contour, as depicted by a and b in FIG. 7, lies in a plane P in FIG. 7 including the front focal point of the lens 14 which is immediately downstream of the conical light-refracting element 19. Thus, FIGS. 4 and 5 clearly show that positioning the holographic diffuser 100 at the front focal point of the lens 14 where the size of the contour is smallest allows the holographic diffuser to effectively function as a diffuser to provide the highest efficiency of light utilization and the highest average corner illuminance. However, this arrangement is impractical because the diffuser 100 cannot be placed inside the conical light-refracting element 19. Therefore, the holographic diffuser is preferably positioned immediately after the conical light-refracting element 19 in a light propagation direction. The manufacturing specification of the lens 14 and arrangement thereof in the optical path are specified so that the holographic diffuser 100 may be positioned as close as possible to the front focal point of the lens 14, thereby illuminating the target 6 with high efficiency and uniformity. However, the arrangement of the holographic diffuser 100 in the optical path may also be determined in accordance with other conditions if sufficient performance is obtained.

The aforementioned conical light-refracting element 19 is preferably a cone of a transparent glass medium or a polymer medium and arranged in the optical path so that the axis of the cone is in line with the optical axis 2 and the light is incident upon the flat surface of the cone.

With this illumination optical system where the reflecting mirror 12 is used to converge the bundle of rays emitted from the light source lamp 11, light is not reflected at all by the round hole 13 which is formed in the middle of the reflecting mirror 12 to receive the lamp 11 and hold the lamp 11 therein. Moreover, the lamp 11 itself blocks a bundle of rays. Therefore, the luminous flux is less intense in an area (the hatched portion 16 in FIG. 1) close to the optical axis 2 than in other areas. This is also a source of poor uniformity of illumination on the target 6. However, selecting the vertex angle and refracting index of the conical light-refracting element 19 allows adjustment of the cone angle of luminous flux by virtue of the refraction effect at the boundary between the conical light-refracting element 19 and the air or other surrounding medium. Thus, positioning the conical light-refracting element 19 in the converged luminous flux simplifies the design of the optical system downstream of the element 19, and while still maintaining a small size for the structural elements, thereby effectively improving uniformity of illumination. For this reason, the conical light-refracting element 19 is preferably positioned in proximity to the focal point of the reflecting mirror 12. The light source apparatus according to the embodiment improves light intensity in the area within a cone angle of about ten degrees of the optical axis, thereby providing highly uniform luminous flux downstream of the conical light-refracting element 19.

It is well known that when an elliptical mirror having an ellipsoidal surface of revolution centered on the optical axis is used, light emitted from a lamp positioned in proximity to the first focal point of the elliptical mirror may be highly efficiently converged in proximity to the second focal point.

Figure 8:
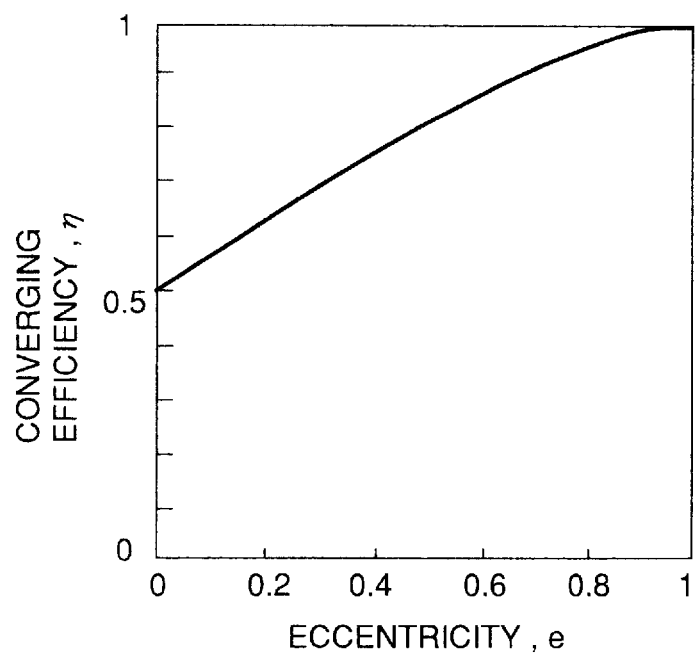
FIG. 8 is a graph of eccentricity vs. converging efficiency of an elliptical mirror assuming that the light source is a point source.

FIG. 8 is a graph of eccentricity vs. converging efficiency of an elliptical mirror assuming that the light source is a point source. The converging efficiency $\eta$ is high with increasing eccentricity $\underline{e}$ and an eccentricity $\underline{e}$ greater than 0.6 offers a converging efficiency $\eta$ greater than 85%. However, larger eccentricities make the elliptical mirror longer in the direction of axis of rotation and such an elliptical mirror is difficult to manufacture using ordinary glass material.

Figure 9:
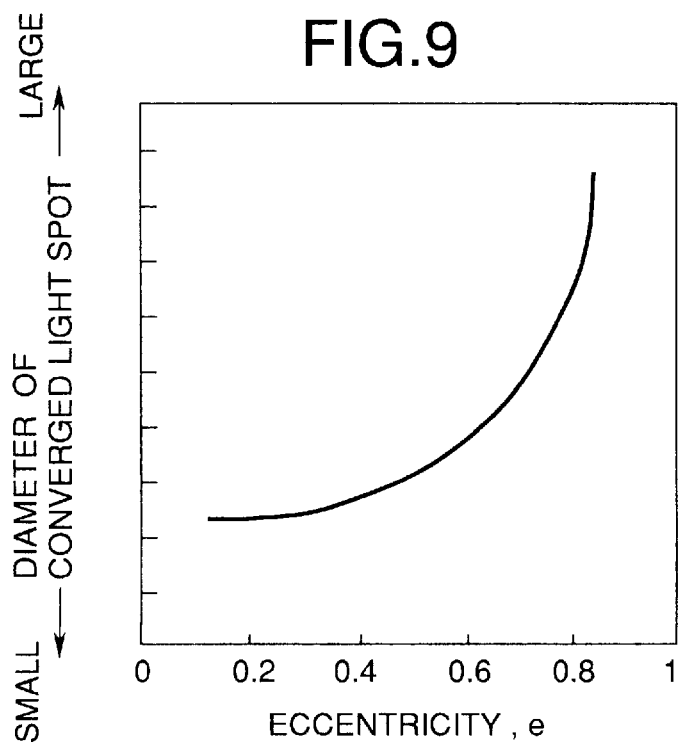
FIG. 9 illustrates the relationship between eccentricity of an elliptical mirror and the diameter of a converged light spot formed in proximity to the second focal point.

FIG. 9 illustrates the relationship between eccentricity $\underline{e}$ and diameter of converged light spot formed in proximity to the second focal point. FIG. 9 shows that smaller eccentricities offer a smaller diameter for the converged light spot. Thus, there is a tradeoff between the parameters of an elliptical mirror. In the present invention, an eccentricity in the range from 0.6 to 0.75 is preferable.

The light emitting element 11 is preferably offset from the first focal point of reflecting mirror 12 for more efficient convergence of light. The reflecting mirror 12 used in the first embodiment is preferably an elliptical mirror having an aperture of 66 mm, f1=15 mm (the distance between the vertex and the first focal point), f2=75 mm (the distance between the vertex and the second focal point), f2−f1=60 mm (the distance between the first and second focal points), and an eccentricity e=0.67. The lamp 11 in a preferred form of the first embodiment takes the form of a metal halide lamp having a discharge arc length of 3 mm and is positioned so that the center of the arc is Δ=1 to 3 mm from the first focal point toward the second focal point. If an elliptical mirror analogous to the one used in the first embodiment is to be used, the lamp is preferably positioned so that the middle portion of the arc is offset from the first focal point toward the second focal point, specifically Δ/f1=0.067 to 0.2.

The reflecting mirror 12 may alternatively be in the form of an OPR (Orthogonal Parabolic Reflector). The reflecting surface of a conventional parabolic mirror is a curvature described by the rotation of a curve given by Equation (1) about the x-axis of the ordinary coordinate (x, y):

$$y^2 = 4fx \qquad \qquad \ldots (1)$$

where $\underline{f}$ is a focal length.

Figure 10:
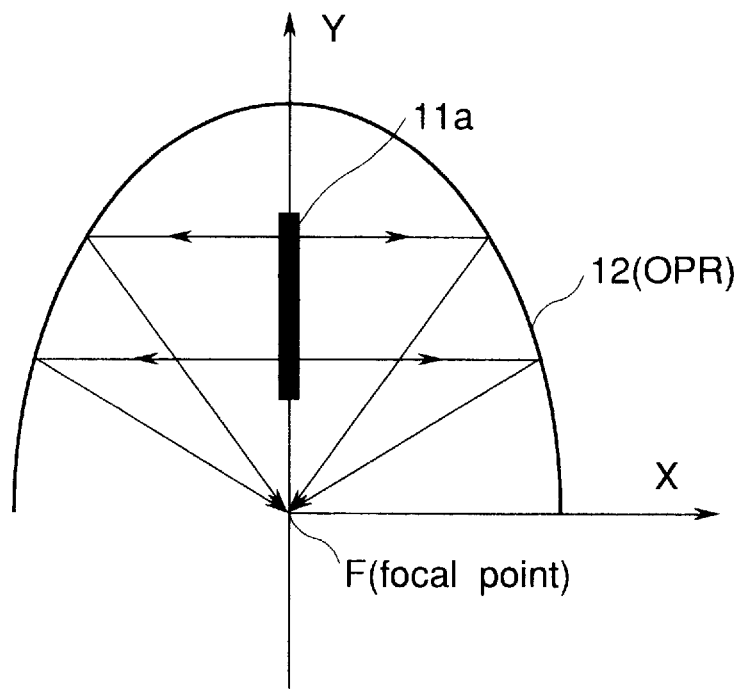
FIG. 10 illustrates an orthogonal parabolic reflector (OPR) which may be used in the light source apparatus according to the first embodiment.

The OPR shown in FIG. 10 has a curvature described by the rotation of a curve derived from Equations (2) and (3) about the Y-axis.

$$Y = 2\{f(f+X)\}^{1/2} \qquad \text{where } -f \leq X \leq 0 \ldots (2)$$

$$Y = 2\{f(f-X)\}^{1/2} \qquad \text{where } 0 \leq X \leq f \ldots (3)$$

The coordinate (X, Y) is an orthogonal coordinate obtained by shifting the orthogonal coordinate (x, y) of Equation (1) in the x-axis so that the origin of the coordinate (X, Y) is (f, 0) of the coordinate (x, y). FIG. 10 illustrates the principle of the OPR. A strip-shaped light emitting element 11a, e.g., discharge arc of a metal halide lamp) lies on the Y-axis of the OPR 12. The OPR functions to efficiently converge the light, which is emitted by the light emitting element 11a in a direction perpendicular to the direction in which the strip-shaped light emitting element 11a extends, to a focal point F. In the present invention, the strip-shaped arc 11a of the discharge lamp 11 is preferably positioned on the Y-axis (rotation axis) of the OPR 12.

While the first embodiment has been described with respect to the target 6 which may have a particular form, i.e., a liquid crystal panel, the light source apparatus of the first embodiment may of course be used as an illumination apparatus, being capable of illuminating any desired area with high illumination and color uniformity.

Second Embodiment

Figure 11:
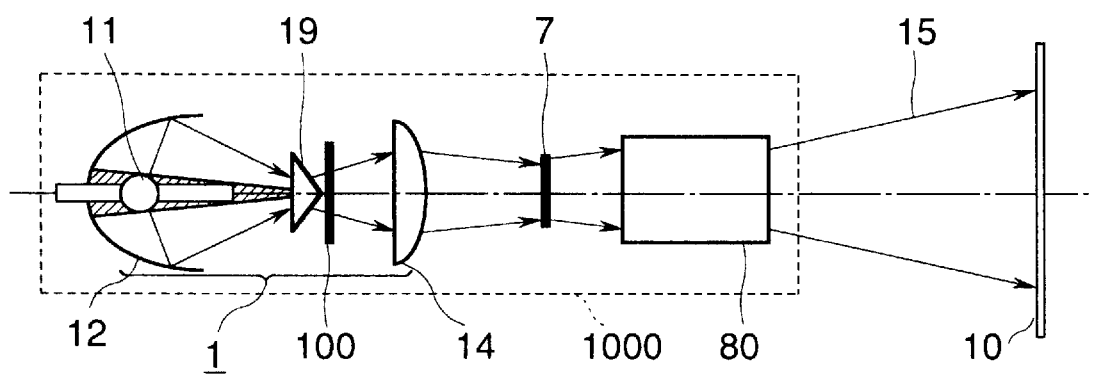
FIG. 11 illustrates a projection type display apparatus using a light source apparatus according to a second embodiment.

FIG. 11 illustrates a projection type display apparatus using a light source apparatus according to a second embodiment. Referring to FIG. 11, the projection type display apparatus 1000 includes a light source apparatus 1, light valve 7 in the form of, for example, a liquid crystal display with a color filter, and projection lens 80 which could be of any construction as far as a desired projected image is obtained. The projection lens 80 projects a light beam 15 to a screen 10 in the form of, for example, a reflection type screen.

The operation of the second embodiment will now be described. The light source apparatus 1 is the same as that of the first embodiment and description thereof is omitted. The light source apparatus 1 efficiently illuminates the light valve 7 and the image formed by the light valve 7 is projected by the projection lens 80 onto the screen 10. If a single liquid crystal panel with a color filter is used as the light valve 7, the light source apparatus 1 offers a color projection image with high intensity and color uniformity.

Third Embodiment

Figure 12:
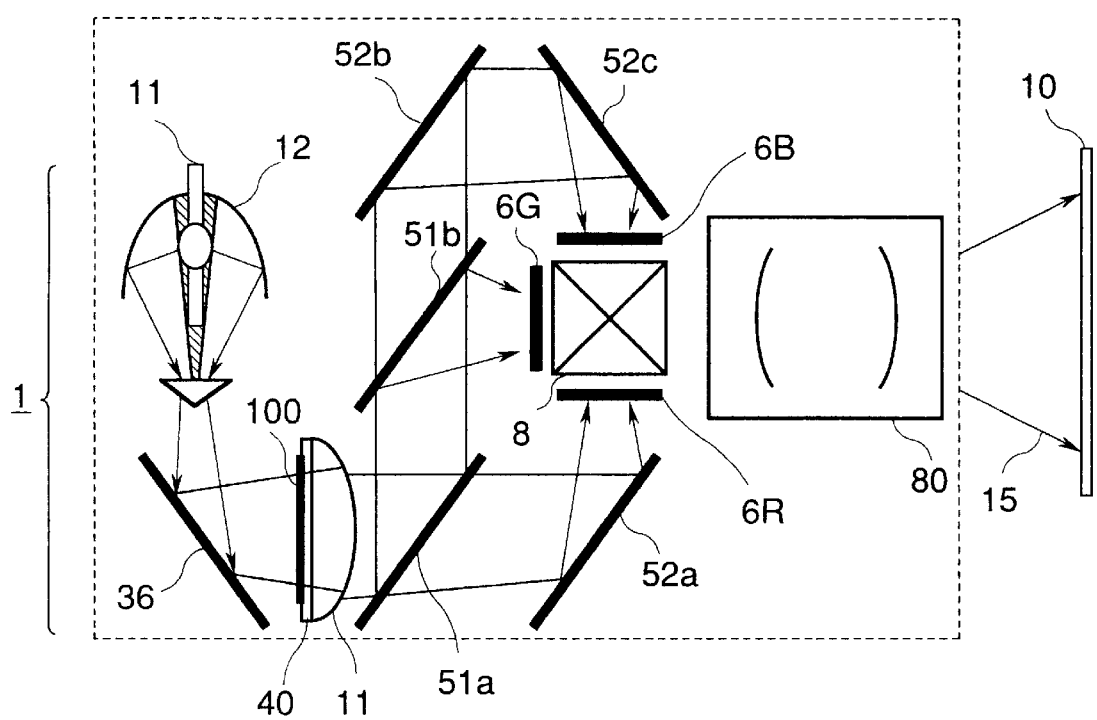
FIG. 12 illustrates a general construction of a projection type display apparatus according to a third embodiment.

FIG. 12 illustrates a general construction of a three-light valve projection type display apparatus 2000 according to a third embodiment of the invention. Referring to FIG. 12, a bending mirror 36 takes the form of, for example, a cold mirror, which is inserted in an optical path of the light source apparatus 1 and serves to bend the luminous flux. A filter 40 passes only visible light and blocks ultra violet rays and infrared rays. The light valves 6R, 6G, and 6B are, for example, monochrome liquid crystal panels for red, green, and blue light, respectively. Color separators 51a and 51b take the form of, for example, a dichroic mirror and a dichroic filter, respectively. Reflecting mirrors 52a, 52b, and 52c are in the form of, for example, a mirror. A color synthesizer 8 is, for example, a dichroic cross prism. A projection lens 80 may be of any form as far as a desired projection image is obtained. A holographic diffuser 100 is disposed on the surface of the filter 40 upon which the luminous flux is incident.

The operation of the third embodiment will now be described. The operation of the light source apparatus 1 is substantially the same as that of the light source apparatus of the first embodiment and therefore description thereof is omitted.

The color separators 51a and 51b efficiently separate the luminous flux exiting the lens 14 into light of three colors of light, i.e., red, green, and blue. The light of the respective colors is efficiently directed to the corresponding light valves 6R, 6G, and 6B which modulate the light passing therethrough. The light of the respective colors having image information is combined by the color synthesizer 8 into a full color image, which in turn is projected by the projection lens 80 to form beam 15 which impinges onto the screen 10.

The holographic diffuser 100 is effective in improving both the uniformity of intensity and the uniformity of color. Just as in the first embodiment, the relationship between diffusion effect and location at which the holographic diffuser 100 is inserted was investigated in order to determine differences in effect between three kinds of holographic diffusers and a surface diffuser.

FIG. 13 shows Table 1 which lists values for a total of five cases: a diffusion plate is not inserted, a surface diffuser polished by ground glass #1500 is inserted, and three different holographic diffusers are inserted.

The surface diffuser offers high corner-to-center illuminance ratio that improves uniformity of illumination and color, but results in decreased total luminous flux which is about half that obtained when no diffuser is inserted. The tendency of improvement in total luminous flux by inserting holographic diffusers in the third embodiment as shown in Table 1 (FIG. 13) is different from that in the first embodiment as shown in FIG. 4. In other words, in the first embodiment, total luminous flux is higher when any of the three different holographic diffusers is inserted than when the surface diffuser is inserted. In contrast, the total luminous flux (130.3 lm) obtained by inserting a holographic diffuser having a diffusion angle of 5 degrees is higher than that (114.7 lm) obtained by inserting the surface diffuser, while the total luminous fluxes of 92.3 lm and 72.7 lm obtained by inserting the 10-degree holographic diffuser and elliptical diffuser (20˚×10˚), respectively, are less than 114.7 lm obtained by inserting the surface diffuser. This is due to the fact that the bending mirror 36 is disposed in front of the lens 14 and therefore the holographic diffuser 100 in the third embodiment is in contact with the filter 40 placed on the flat surface of the lens 14. That is, the hologram diffuser is farther away from the secondary light source in the third embodiment than in the first embodiment where the holographic diffuser is immediately after the conical light-refracting element 19.

The holographic diffuser having a circular diffusion angle of 5 degrees provides a central illuminance of 780 lx which is a significant improvement of about 15% from 686 lx obtained by inserting the surface diffuser. The corner-to-center illuminance ratio of 34.1%, however, is not a significant change from 35.7% obtained by the surface diffuser. Thus, it can be said that the hot spot in the center of the screen is effectively diffused with the holographic diffuser while significantly improving the central illuminance. The positions of the holographic diffusers must of course be precisely adjusted for optimum result, but the above investigation reveals that a holographic diffuser having a diffusion angle of only 5 degrees is still effective in improving the uniformity of color to a practical level.

The elliptical holographic diffuser has one more degree of freedom in the design of lighting apparatuses than circular holographic diffusers and may be used for illuminating a rectangular target such as a liquid crystal panel having an aspect ratio of, for example, 16:9, thereby providing a very high illumination efficiency. As mentioned above, holographic diffusers provide a luminous flux having a desired cross section. Illumination efficiency will further be increased if a rectangular-diffusion type hologram is used. Still further, positioning the holographic diffuser 100 immediately downstream of the conical light-refracting element 19 just as in the second embodiment will greatly increase total luminous flux as shown in FIG. 4.

Fourth Embodiment

The aforementioned light source apparatus and projection type display apparatus may also be applied to a multiprojection type display apparatus.

Figure 14:
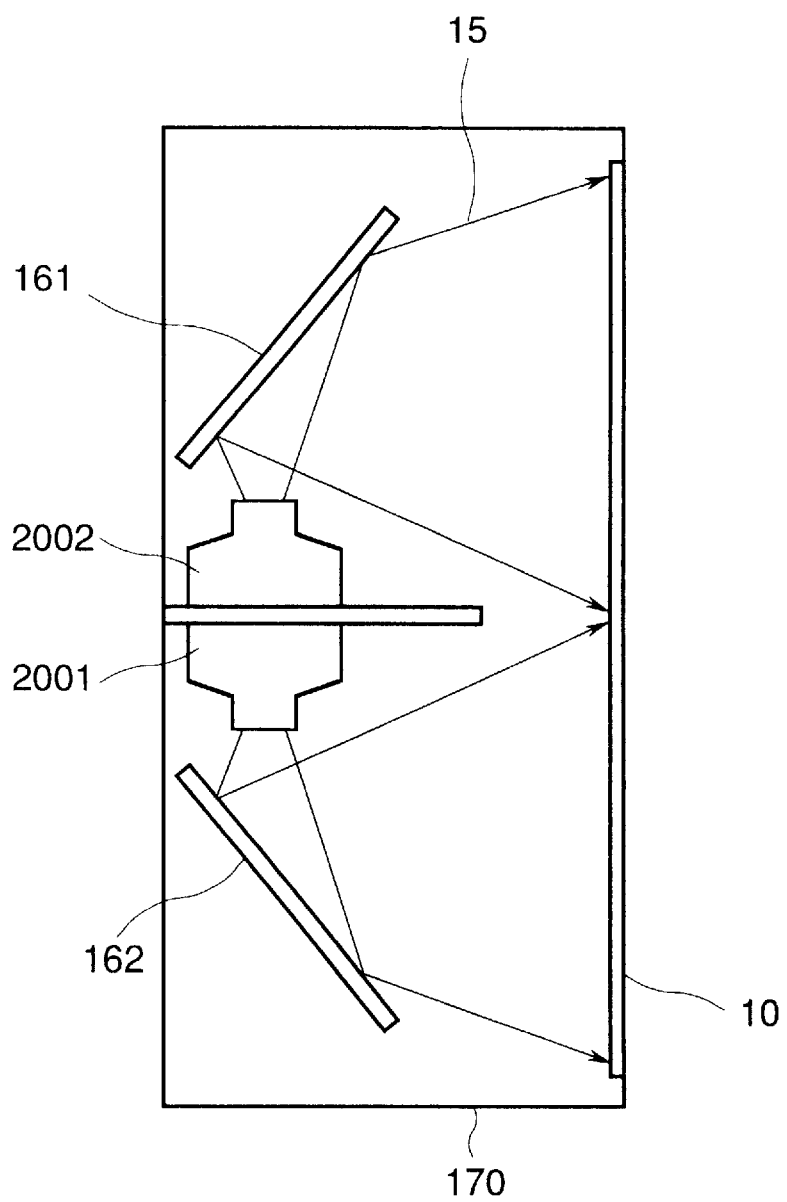
FIG. 14 is a cross-sectional side view of a multiprojection type display apparatus according to a fourth embodiment.
Figure 15:
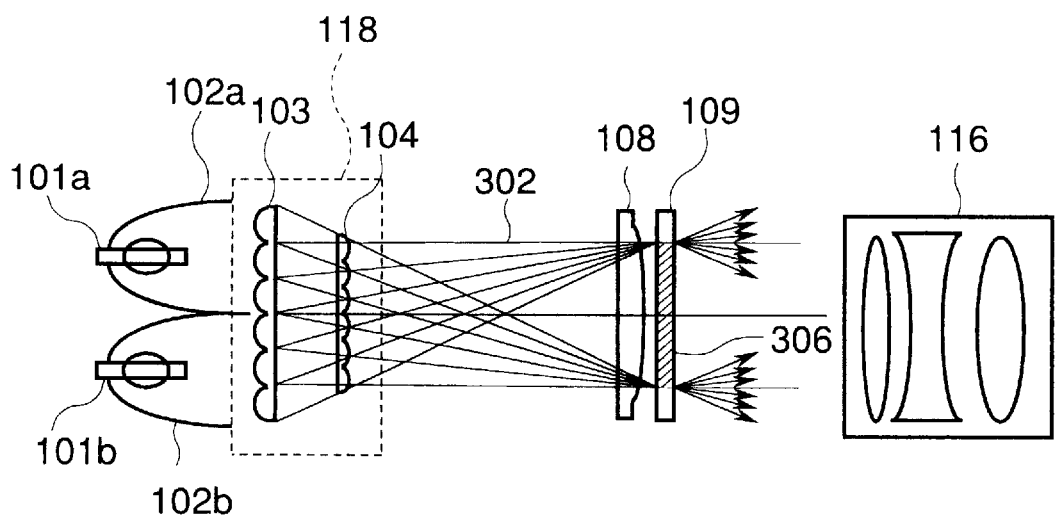
FIG. 15 illustrates a general construction of a prior art projection type display apparatus.

FIG. 14 is a cross-sectional view side of a multiprojection type display apparatus according to a fourth embodiment. Referring to FIG. 14, projectors 2001 and 2002 each include a three-light valve projection type display apparatus according to the third embodiment. A cabinet 170 houses reflecting mirrors 161 and 162 and a screen 10 in the form of a rear projection type screen. Other projectors may be arranged in the direction perpendicular to the page of FIG. 14, thereby forming, for example, a 2×2 four-subscreen multiprojection type display apparatus.

The operation of the fourth embodiment will now be described. Light beams projected from a plurality of projectors 2001 and 2002 are bent by the reflecting mirrors 161 and 162 to the screen 10 which is supported by the cabinet 170. A projector such as a liquid crystal projector has non-uniformities in intensity and color due to the characteristics of the color separating/combining optical system and light source. Such a projector results in prominently deteriorated image quality when used in combination to form a large screen. In the fourth embodiment, a holographic diffuser is inserted into the illumination optical system of each projector 2001 and 2002 as taught in third embodiment and effectively solves variations in image quality among a plurality of projected images, providing a multiprojection type display apparatus having efficiently reduced non-uniformities in intensity and color. The present invention lends itself to constructing a lighter weight and smaller sized projector which in turn permits implementing a lighter weight and smaller sized multiprojection type display apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light source apparatus, comprising:
   a light emitting element emitting a luminous flux;
   a reflecting mirror converging the luminous flux emitted by said light emitting element;
   a conical light-refracting element changing a cone angle of the luminous flux converged by said reflecting mirror;
   a lens converging the light exiting said conical light-refracting element; and
   a holographic diffuser causing the luminous flux to diffuse, wherein said holographic diffuser is disposed in a light path between said conical light-refracting element and said lens.

2. The light source apparatus according to claim 1, wherein said reflecting mirror is an elliptical mirror having an ellipsoidal surface of revolution centered on an optical axis thereof and having a first focal point and a second focal point, and said light emitting element is disposed in proximity to the first focal point.

3. The light source apparatus according to claim 2, wherein said light emitting element is a discharge lamp and a middle portion of a light-emitting portion of said discharge lamp is on the optical axis between said first and second focal points of said elliptical mirror so that $0.6 \leq e \leq 0.75$ and $0.06 \leq \Delta/f1 \leq 0.2$
where f1 is a first focal length of said elliptical mirror, $\underline{e}$ is an eccentricity of said elliptical mirror, and $\Delta$ is a distance from the first focal point to the middle portion.

4. The light source apparatus according to claim 1, wherein said reflecting mirror has a parabolic curvature described by the rotation of a curve derived from equations $$Y=2\{f(f+X)\}^{1/2} \qquad \text{where } -f \leq X \leq 0$$

$$Y=2\{f(f-X)\}^{1/2} \qquad \text{where } 0 \leq X \leq f$$

about the Y-axis of an orthogonal coordinate (X, Y) where $\underline{f}$ is a focal length of the parabolic curvature.

5. The light source apparatus according to claim 1, wherein said conical light-refracting element is disposed in proximity to a focal point of said reflecting mirror.

6. The light source apparatus according to claim 5, wherein said conical light-refracting element is disposed so that light is incident upon a flat surface thereof and an axis thereof is substantially aligned with an optical axis of said reflecting mirror.

7. The light source apparatus according to claim 1, wherein said holographic diffuser is disposed in proximity to a front focal point of said lens.

8. A projection type display apparatus incorporating said light source apparatus according to claim 1, comprising:
   a light valve producing an image;
   said light source apparatus emitting a luminous flux to illuminate said light valve; and
   a projection lens enlarging and projecting the image emitted by said light valve.

9. The projection type display apparatus according to claim 8, further comprising:
   color separating means separating the luminous flux emitted from said light source apparatus into a plurality of colors of light;
   a plurality of light valves each of which is disposed in a light path of a corresponding color of light; and
   color synthesizing means disposed between said light valves and said projection lens, said color synthesizing means synthesizing the plurality of colors of light into an image.

10. The projection type display apparatus according to claim 9, wherein said color separating means includes a dichroic mirror, and said color synthesizing means is a dichroic prism.

11. The projection type display apparatus according to claim 9, wherein said color separating means includes a dichroic filter, and said color synthesizing means is a dichroic prism.

12. A multi-projection type display system incorporating a plurality of projection type display apparatuses according to claim 8 each of which projects a corresponding image, the system further comprising:
   at least one reflecting mirror bending a corresponding one of said images from said projection type display apparatuses; and
   a screen onto which said reflecting mirror projects the images so that the images emitted from said plurality of projection type display apparatuses are combined into a composite image on said screen.

13. The multi-projection type display system according to claim 12, wherein each of said projection type display apparatuses includes:
   color separating means separating the received luminous flux emitted from said light source apparatus into a plurality of colors of light;
   a plurality of light valves each of which is disposed in a light path of a corresponding color of light; and
   color synthesizing means disposed between said light valves and said projection lens, said color synthesizing means synthesizing the plurality of colors of light into an image.

14. The light source apparatus according to claim 1, said holographic diffuser shaping an input luminous flux into an output flux having a different cross section than the input luminous flux.

15. The light source apparatus according to claim 14, wherein said holographic diffuser is a circular holographic diffuser shaping the input luminous flux into an output luminous flux having a circular cross section.

16. The light source apparatus according to claim 14, wherein said holographic diffuser is an elliptical holographic diffuser shaping the input luminous flux into an output luminous flux having an elliptical cross section.

17. The light source apparatus according to claim 14, wherein said holographic diffuser is a rectangular holographic diffuser shaping the input luminous flux into an output luminous flux having a rectangular cross section.

* * * * *